United States Patent [19]

Takehana et al.

[11] Patent Number: 4,878,080
[45] Date of Patent: Oct. 31, 1989

[54] CAMERA ZOOM LENS AUTOMATIC MAGNIFICATION APPARATUS

[75] Inventors: Takamichi Takehana; Osamu Murayama; Hideaki Nakajima; Masatoshi Yamada, all of Okaya; Makoto Hamada, Nagano, all of Japan

[73] Assignee: Chinon Kabushiki Kaisha, Japan

[21] Appl. No.: 232,100

[22] Filed: Aug. 15, 1988

[30] Foreign Application Priority Data

Mar. 14, 1988 [JP] Japan .................................. 63-59885

[51] Int. Cl.$^4$ ............................................. G03B 3/10
[52] U.S. Cl. ..................................................... 354/403
[58] Field of Search ............... 354/400, 403, 404, 409, 354/406–408; 350/429; 250/201 AF

[56] References Cited

U.S. PATENT DOCUMENTS 4,740,806  4/1988  Takehana ............................ 354/403
4,827,303  5/1989  Tsuboi ................................. 354/403

FOREIGN PATENT DOCUMENTS 62-118328  5/1987  Japan .

Primary Examiner—L. T. Hix
Assistant Examiner—David M. Gray
Attorney, Agent, or Firm—Arnold, White & Durkee

[57] ABSTRACT

A camera zoom lens automatic magnification apparatus for automatically changing the focal length of a zoom lens wherein distances to at least three points on a subject—at the center, to the left and to the right—in the angle of view are measured by a range finding device and a zoom lens driving device for changing the focal length of the zoom lens is controlled by a control device according to the output of the range finding device. The control device consists of a first decision device to decide which point is the nearest by comparing the distances to each point measured by the range finding device, a second decision device which, based on the lens focal length corresponding to the closest distance as found by the first decision device and on the depth of field for that focal length, checks if there is any other point's distance that is within the depth of field for that focal length, a third decision device which determines the zoom ratio according to a predetermined program using the result of the second decision device, and an output device which drives the zoom lens driving device according to the third decision device.

2 Claims, 2 Drawing Sheets

DISTANCE TO SUBJECT (m) →

CAMERA ZOOM LENS AUTOMATIC MAGNIFICATION APPARATUS

BACKGROUND OF THE INVENTION

1. Field of the Invention

The invention relates to a camera zoom lens automatic magnification apparatus applied to still cameras and movie cameras which automatically adjusts the focal length of a zoom lens according to the distance to a subject to be photographed and the area coverage of the subject in the angle of field.

2. Description of the Prior Art

When a particular subject is to be photographed continuously, an apparatus such as disclosed in the Japanese Patent Publication No. 1602/1985 can be used which automatically changes the focal length (zoom ratio) of the zoom lens according to the change in the distance to the subject to keep constant the relative size of a subject with respect to the angle of view. The publication also discloses that such an apparatus is very convenient and effective when used in combination with an automatic focusing device.

Another Japanese Patent Publication No. 118328/1987 proposes an apparatus which performs automatic magnification for a two-focal-point camera or a zoom lens camera according to the information on the distance to a subject located at the center in the angle of view.

With the method employed in the above-mentioned apparatuses, the lens magnification control is performed based on only the distance to the subject and the area the subject occupies in the angle of view is not considered at all. As long as the sizes of subjects are uniform, it is possible to make almost constant the relative sizes of subjects with respect to the angle of view by changing the focal length of the zoom lens according to the distance to the subject. However, subjects may be different in size and have different situations and it is very difficult to keep constant the sizes of the subjects relative to the angle of view.

With a conventional distance measuring device, the distance measurement is made of only a small area at the center of the angle of view, so that when the subject is deviated from the central area, the magnification control which is based on the information on distance to the central area will not be performed correctly.

SUMMARY OF THE INVENTION

The object of the invention is to provide a camera zoom lens automatic magnification apparatus which provides an optimum zoom ratio in accordance with the size and position of the subject in the angle of view.

The camera zoom lens automatic magnification apparatus according to the invention which automatically changes the focal length of a zoom lens according to a subject to be photographed, comprises: a zoom lens driving device for changing the focal length of the zoom lens; a range finding device which measures distances to at least three points on the subject—at the center, to the left and to the right—in the angle of view; and a control device which controls the zoom lens driving device according to the output of the range finding device, the control device consisting of a first decision means to decide which point is the nearest by comparing the distances to each point measured by the range finding device, a second decision means which, based on the lens focal length corresponding to the closest distance as found by the first decision means and on the depth of field for that focal length, checks if there is any other point's distance that is within the depth of field for that focal length, a third decision means which determines the zoom ratio according to a predetermined program using the result of the second decision means, and an output means which drives the zoom lens driving device according to the third decision means.

The camera zoom lens automatic magnification apparatus of the invention provides to the zoom ratio decision means a function of increasing the zoom ratio toward the telephoto side when the central point is at the closest distance and when no other point's distance falls within the depth of field for the focal length of the lens corresponding to the closest distance.

In the apparatus of the invention, the distance to the subject is measured for at least three points in the angle of view, a central point, a point to the left and a point to the right. The three distances are compared to determine a point with the closest distance. Based on the lens focal length corresponding to the closest distance and on the depth of field for that focal length, it is checked whether there is any other point's distance falling within the depth of field. According to the check result, the zoom ratio is determined. This allows an optimum zoom ratio to be determined according to the relative size of the subject with respect to the angle of view. Moreover, even when the subject is off the center in the angle of view, the magnification control can be properly performed providing an optimum zoom ratio.

Other objects and features of the invention will be described by referring to the attached drawings.

DESCRIPTION OF THE PREFERRED EMBODIMENT

Figure 1:
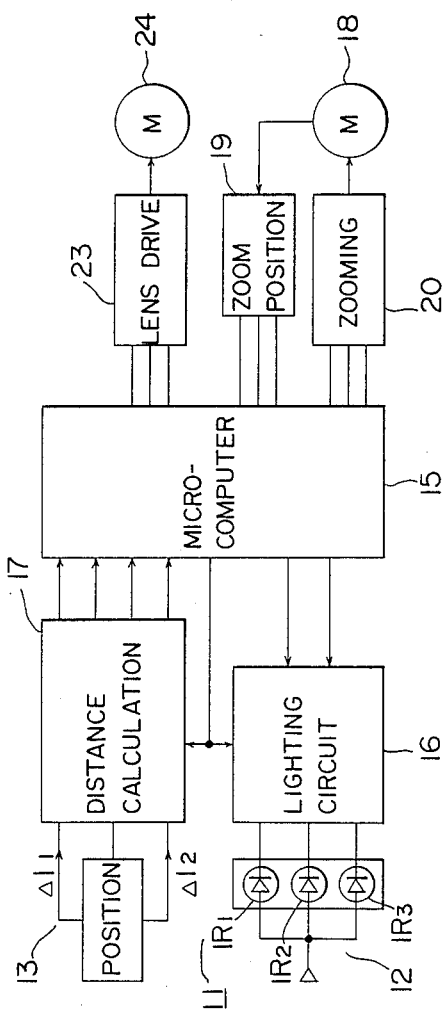
FIG. 1 is a block diagram showing one embodiment of the camera zoom lens automatic magnification apparatus according to the invention.

In FIG. 1, reference numeral 11 designates a range finding device which consists of an IR-LED array 12 having a plurality of infrared light emitting elements (simply referred to as light emitting elements) $IR_1$, $IR_2$, $IR_3$, a one-dimensional semiconductor position detection element (simply referred to as a PSD) 13 which receives infrared rays that have been successively radiated to a subject not shown from the light emitting elements $IR_1$, $IR_2$, $IR_3$ and reflected by the subject. Depending on the position where the reflected beams are received, the PSD 13 generates distance signals $\Delta I_1$, $\Delta I_2$ that correspond to the distances to the subject.

Figure 2:
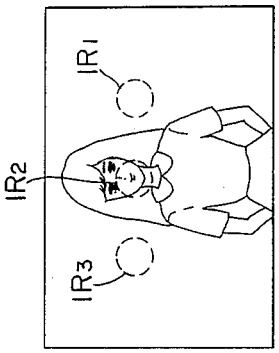
FIG. 2 is an image provided by the three-point range finding device of FIG. 1 explaining the arrangement of the three points in the angle of view.

The light emitting elements $IR_1$, $IR_2$, $IR_3$ are, as shown in FIG. 2, arranged in such a way as to measure the distances to at least three points on the subject—at the center, to the right and to the left—in the angle of view.

The light emitting elements $IR_1$, $IR_2$, $IR_3$ are controlled to be turned on and off by signals sent through a lighting circuit 16 from a microcomputer 15 as a control device.

The distance signals $\Delta I_1$, $\Delta I_2$ from the PSD 13 are converted into measured distance information (m-bit digital signals) for each point by a distance calculation circuit 17 and entered into the microcomputer 15.

The microcomputer 15 controls the operation timing for each circuit and also stores the measured distance information from the distance calculation circuit 17 as m-bit digital signals for each point. The microcomputer 15 also has a function of determining from the lighting timing of the light emitting elements $IR_1$, $IR_2$, $IR_3$ from which of the three points the closest distance information has been obtained. The other functions of the microcomputer 15 include: a first decision function of determining which point is closest by comparing the distances to the points as measured by the range finding device 11; a second decision function of determining—based on the lens focal length corresponding to the closest distance as determined by the above function and on the depth of field for that focal length—whether there is any other point's distance falling within the depth of field; a third decision function of determining the zoom ratio according to the predetermined program using the result of the second decision function; and an output function of driving a zoom motor as the zoom lens driving device according to the zoom ratio as determined by the third decision function.

The microcomputer 15 then determines the zoom driving amount from the determined zoom ratio and the current zoom position entered from a zoom position detector (encoder) 19. It now gives the zoom driving amount to a zoom driving circuit 20 to drive a zoom motor 18 and thereby magnify the lens to the determined zoom ratio.

At the same time, the microcomputer 15 also gives the control signal based on the closest distance information to the lens driving circuit 23 to drive a lens motor 24 and thereby bring the lens into focus at the closest distance.

The range finding device 11 measures distances to three points on the subject by using the three light emitting elements $IR_1$, $IR_2$, $IR_3$ and one PSD 13. The optical system for the range finding device 11 will be explained by referring to FIG. 4.

Figure 4:
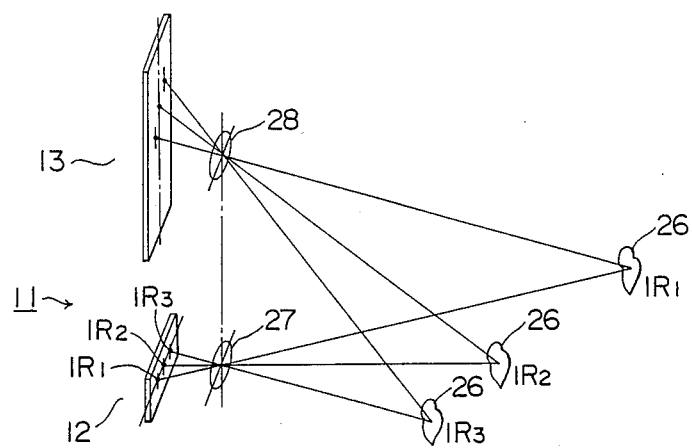
FIG. 4 is a perspective view of an optical system of the three-point range finding device of FIG. 1.

This optical system, as shown in FIG. 4, has three light emitting elements $IR_1$, $IR_2$, $IR_3$ arranged horizontally to cover a horizontally scattered subjects (standard human figure charts) 26. In measuring the distance, these light emitting elements are successively illuminated to radiate beams through a projection lens 27 against the subjects 26, as shown in FIG. 4. The reflected beams from the subjects 26 are received through an incident lens 28 into the PSD 13. The PSD 13 can detect the incident positions of beams only in the direction of a reference line length L (distance between the projecting lens 27 and the incident lens 28) and does not detect any change in the incident positions of beams in the horizontal direction perpendicular to the reference line length L. That is, the beams radiated from the light emitting elements $IR_1$, $IR_2$, $IR_3$ and reflected from the subjects 26 are received into the PSD 13 staggered from each other horizontally. This horizontal deviation among the incident beams is not detected but only the incident beam positions in the direction of reference line length L which correspond to the distances to the subjects 26 is detected. Therefore, from the incident positions, it is possible to determine the distance to each of the points on the subject 26 for each light emitting element $IR_1$, $IR_2$, $IR_3$.

Figure 3:
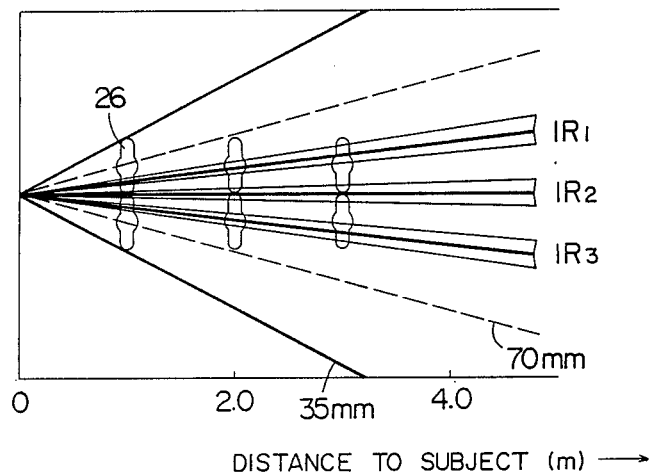
FIG. 3 is a diagram showing the relation between the range finding beams of light of the three-point range finding device of FIG. 1 and a subject.

FIG. 3 shows the relationship to be set up between the range finding area of the range finding device 11 and the angle of view of the zoom lens. As shown in the figure, in the case of two-time magnified zoom, although the zoom field is reduced to half, the permanent range finding view defined by light beams has some margins with respect to the angle of view obtained by the most magnified telephoto lens.

The projecting lens 27 of FIG. 4 is designed so that the diameter of the projecting beams is about 60 mm at the distance of 3 m and about 120 mm at 6 m. The beams of light from the light emitting elements $IR_1$, $IR_3$ on each side have an angle of approximately 16° with respect to the lens axis.

Now, we will explain the method of determining the zoom ratio for a 35 mm camera with a 35–75 mm zoom lens by referring to the following table.

| Set distance (m) | AF step | Focal length (mm) | | | | | | | |
|---|---|---|---|---|---|---|---|---|---|
| | | 36.16 | 38.78 | 44.03 | 49.28 | 54.53 | 59.78 | 65.03 | 67.66 |
| 1.000 | 1 | Prog | | Prog | | | Prog | | |
| | | 3 | | 2 | | | 1 | | |
| 1.058 | 2 | 3 | | 2 | | | 1 | | |
| 1.123 | 3 | 3 | | 2 | | | 1 | | |
| 1.198 | 4 | 3 | | 2 | | | 1 | | |
| 1.284 | 5 | 3 | | 2 | | | 1 | | |
| 1.385 | 6 | 3 | | 2 | | | 1 | | |
| 1.505 | 7 | 3 | | 2 | | | 1 | | |
| 1.649 | 8 | 3 | | 2 | | | 1 | | |
| 1.825 | 9 | 3 | | 2 | | | 1 | | |
| 2.046 | 10 | | 3 | 2 | | | 1 | | |
| 2.332 | 11 | | | 3,2 | | | 1 | | |
| 2.714 | 12 | | | | 3,2 | | 1 | | |
| 3.253 | 13 | | | | | 3,2 | 1 | | |
| 4.070 | 14 | | | | | | 3,2,1 | | |
| 5.454 | 15 | | | | | | | 3,2,1 | |
| 8.309 | 16 | | | | | | | | 3,2,1 |

In the above table, the set distance (m) is plotted at the interval of lens field depth. The AF step signifies distance information corresponding to the set distance for setting the lens. The columns to the left represent the focal lengths of the lens in mm.

Now, let the measured distance information for the central point be N2, the measured distance information for the right-hand point be N1 and the measured distance information for the left-hand point be N3. The depth of field when the lens is focused at the closest point is defined as α.

In the above table, three programs (Prog1, Prog2, Prog3) are set for each distance information (AF step). Prog3 represents a case where the focal length of the lens (zoom ratio) is set only from the distance information. Prog2 and Prog1 represent a case where zoom ratio is set not only from the distance information but also from the area coverage or size of a subject in the angle of view which is determined from the depth of field of the lens as described later and where the zoom ratio is thereby increased toward the telephoto side. When the distance information is large and close to infinity, the zoom ratio set only from the distance information becomes large, so that the focal lengths of Prog3 and Prog2 or those of Prog3, Prog2 and Prog1 will all be equal.

Now, we will explain the action of the apparatus when a picture is taken at the set distance (AF step 9) of 1.825 meters.

Let us assume that the distance information, i.e., the closest distance information, came from one side in the angle of view (right side or left side). It is checked by a decision means whether the distance to a point at the other side on a subject falls within the depth of field for the lens focused according to the closest distance information. When the check result shows that the distance to the point on the other side is within the depth of field, it is decided that there is a subject to be photographed which covers the entire area of the picture. That is, it is decided that the subject has a large area coverage in the angle of view. In this case, Prog3 is applied and the zoom ratio is not increased toward the telephoto side. This is expressed as follows.

When $|N_1 - N_3| \leq \alpha$,     Prog 3

$N_1 \leq N_2 + \alpha_1$ and $N_3 \leq N_2 + \alpha_3$

Next, let us consider a case where the distance to a point at one side on a subject is the closest 1.825 meters and the distance to the other side point is not within the depth of field for the lens focused at the closest distance. In this case, there is some margin in the angle of view and Prog2 is applied to increase the focal length (room ratio) from 36.16 mm to 44.03 mm toward the telephoto side. This is expressed as When $|N_1 - N_3| > \alpha$,     Prog 2

$N_1 \leq N_2 + \alpha_1$ or $N_3 \leq N_2 + \alpha_3$

If the closest distance information of 1.825 meters is obtained from the central point and distances to the points on both sides are not within the depth of field for the lens focused to the closest distance of 1.825 meters, it is decided that the subject has a small area coverage in the angle of view. In that case, Prog1 is applied to further increase the focal length of the lens (zoom ratio) to 59.78 mm toward the telephoto side. This is expressed as $N_2 < N_1 - \alpha_2$ and $N_2 < N_3 - \alpha_2$     Prog1

When the closest distance information of 1.825 meters is obtained from the central point and one of the distances to the points on each side is within the depth of field of the lens focused to the closest distance of 1.825 meters with the other distance outside the depth of field, Prog2 is used. This is expressed as follows.

$N_2 \geq N_1 - \alpha_2$ and $N_2 < N_3 - \alpha_2$     Prog 2 or $N_2 \geq N_3 - \alpha_2$ and $N_2 < N_1 - \alpha_2$

The value $\alpha$ is a step number (integer) such that when a subject at a distance of $N_2 + \alpha_2$ is photographed, the points at $N_2$ in front of the subject will not be out of focus.

The values of the depth of field $\alpha_1$, $\alpha_2$, $\alpha_3$, as shown in the foregoing table, are each given in two steps. That is, when in Prog3 the distance step exceeds 10, or when in Prog2 it exceeds 12, or when in Prog1 it exceeds 15, the programs cause the zoom ratio to be increased.

The measured distance information for three points is available in $2^3 = 8$ sets of zoom information which is subject arrangement information (also area coverage information of the subject).

To summarize, the zoom ratio is determined in the following way. The distances to at least three points on the subject—at the center, to the right and to the left in the angle of view—are measured; of these measured distances, the shortest distance is determined; based on the focal length of the lens corresponding to the closest measured distance and on the depth of field for the lens with that focal length, it is checked by the decision means whether there is any other measured distance that falls within the depth of field; and depending on the result of this check, the zoom ratio is determined by an other decision means according to a predetermined program.

Unlike the conventional method which determines the zoom ratio only from the distance to the subject, the above method of determining the zoom ratio considers the area coverage by the subject in the angle of view, so that a zoom ratio which is optimum to the state of the subject can be obtained. Furthermore, since the distance measurement is taken for three points, the zoom ratio can be controlled at an optimum value even when the subject is not located at the center in the angle of view. The conventional method which determines the zoom ratio only from the distance to the center point may produce an improper zoom ratio when a subject is not at the center of the angle of view. The apparatus of this invention can cope with any arrangement of the subject in the angle of view.

Generally, when setting the picture framing or zoom size, an operator performs zooming operation while watching a subject through a viewfinder. The conditions in which the picture is taken may be classed into the following three cases.

1. A subject figure is located at the center of the angle of view with background on the remaining area.
2. A subject figure is located at the right or left in the angle of view with the background at the center.
3. A plurality of figures are scattered in the entire area of the angle of view.

With this invention, one of the above situations is automatically selected by utilizing not only the measured distances to the three points but also the preset focal length and the depth of field to perform a "telephoto preferential photographing," for increasing the zoom ratio as much as possible. This prevents a focusing failure when taking a picture. This invention can also provide steel cameras and movie cameras with an ability to act very quickly allowing a photographer to take a picture at a desired timing.

FIG. 1 shows the case where one PSD 13 is used. It is also possible to provide three PSDs 13, from each of which the measured distance information $N_1$, $N_2$ or $N_3$ may be obtained.

This invention can be applied to the basic operation of any kind of compact cameras, single reflex cameras, and video cameras, all with a magnification lens. While in the above embodiment an active method using infrared rays is used on the range finding device that measures the distance to a subject, it is possible to use ultrasonic waves to measure the distances to multiple points or to employ a device which detects the distance to subject in a wide central area in the angle of view and also the area coverage of the subject in the angle of view.

As mentioned above, the apparatus of this invention automatically checks the condition of a subject in the angle of view and performs a so-called telephoto preferential photographing to increase the zoom ratio as much as possible, thus making it possible to obtain an optimum picture framing without requiring complicated operations.

What is claimed is:

1. A camera zoom lens automatic magnification apparatus for automatically changing the focal length of a zoom lens according to a subject to be photographed comprising a zoom lens driving device for changing the focal length of the zoom lens; a range finding device which measures distances to at least three points on the subject—at the center, to the left and to the right—in the angle of view; and a control device which controls the zoom lens driving device according to the output of the range finding device, the control device consisting of a first decision means to decide which point is the nearest by comparing the distances to each point measured by the range finding device, a second decision means which, based on the lens focal length corresponding to the closest distance as found by the first decision means and on the depth of field for that focal length, checks if there is any other point's distance that is within the depth of field for that focal length, a third decision means which determines the zoom ratio according to a predetermined program using the result of tee second decision means, and an output means which drives the zoom lens driving device according to the third decision means.

2. The camera zoom lens automatic magnification apparatus according to claim 1, wherein said zoom ratio decision means has a function of increasing the zoom ratio toward the telephoto side when the central point's distance falls within the depth of field for the focal length of the lens corresponding to the closest distance.

* * * * *